United States Patent
Aho et al.

(10) Patent No.: US 9,491,259 B2
(45) Date of Patent: Nov. 8, 2016

(54) COLLECTIVELY LOADING PROGRAMS IN A MULTIPLE PROGRAM MULTIPLE DATA ENVIRONMENT

(71) Applicant: International Business Machines Corporation, Armonk, NY (US)

(72) Inventors: Michael E. Aho, Rochester, MN (US); John E. Attinella, Rochester, MN (US); Thomas M. Gooding, Rochester, MN (US); Samuel J. Miller, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 641 days.

(21) Appl. No.: 13/800,948

(22) Filed: Mar. 13, 2013

(65) Prior Publication Data

US 2014/0282599 A1  Sep. 18, 2014

(51) Int. Cl.
G06F 9/46 (2006.01)
H04L 29/08 (2006.01)
G06F 9/445 (2006.01)

(52) U.S. Cl.
CPC ............ H04L 67/34 (2013.01); G06F 9/445 (2013.01)

(58) Field of Classification Search
CPC .................................. H04L 67/34; G06F 8/60
See application file for complete search history.

(56) References Cited

U.S. PATENT DOCUMENTS

| | | | |
|---|---|---|---|
| 8,364,844 B2 | 1/2013 | Chen et al. | |
| 2008/0059555 A1* | 3/2008 | Archer | G06F 9/5027 709/201 |
| 2010/0014523 A1* | 1/2010 | Archer et al. | 370/395.3 |
| 2011/0219208 A1* | 9/2011 | Asaad et al. | 712/12 |
| 2012/0047393 A1* | 2/2012 | Budnik et al. | 714/3 |
| 2013/0263138 A1* | 10/2013 | Aho | G06F 9/5072 718/102 |

OTHER PUBLICATIONS

Nicolas Tallet, Pascal Vezolle; Blue Gene/P Application User Worshop; http://scc.acad.bg/ncsa/documentation/Application_User_Worshop.pdf; Nov. 4, 2008; 208 pages.*
Timothy H. Kaiser, Ph.D.; Multiple Program Multiple Data Runs; http://geco.mines.edu/workshop/aug2011/04thu/mpmd.pdf; Aug. 12, 2011; 18 pages.*

* cited by examiner

*Primary Examiner* — H S Sough
*Assistant Examiner* — Kimberly Jordan
(74) *Attorney, Agent, or Firm* — Patterson + Sheridan, LLP

(57) ABSTRACT

Techniques are disclosed for loading programs efficiently in a parallel computing system. In one embodiment, nodes of the parallel computing system receive a load description file which indicates, for each program of a multiple program multiple data (MPMD) job, nodes which are to load the program. The nodes determine, using collective operations, a total number of programs to load and a number of programs to load in parallel. The nodes further generate a class route for each program to be loaded in parallel, where the class route generated for a particular program includes only those nodes on which the program needs to be loaded. For each class route, a node is selected using a collective operation to be a load leader which accesses a file system to load the program associated with a class route and broadcasts the program via the class route to other nodes which require the program.

14 Claims, 5 Drawing Sheets

COLLECTIVELY LOADING PROGRAMS IN A MULTIPLE PROGRAM MULTIPLE DATA ENVIRONMENT

STATEMENT OF GOVERNMENT RIGHTS

This invention was made with government support under Contract No. 0A-45527 awarded by the Department of Energy. The government has certain rights in the invention.

BACKGROUND

Embodiments disclosed herein relate to techniques for loading programs for a multiple program multiple data (MPMD) job on a parallel computing system.

The MPMD programming model for High Performance Computing (HPC) allows multiple programs to run in the same job across multiple tasks. As used herein, a "task" is a process, or multiple processes, running on a compute node of a parallel computing system. A collection of such tasks for performing a computation is referred to herein as a "job." For example, a weather job may include separate programs, each running across a number of tasks, simulating the atmosphere, ocean currents, and radiative flux from the sun, etc. These programs may communicate via, e.g., Message Passing Interface (MPI), to coordinate the atmospheric, ocean current, and radiative flux simulations performed during the job.

When MPMD jobs are started, operating systems on each compute node of the parallel computing system load relevant programs for tasks to run on the node. Typically, a large number (e.g., millions) of tasks across multiple compute nodes participate in a MPMD job, even while the job may only include a few (e.g., 10) unique programs. At load time, each compute node makes a request to a file system to load the programs required for the job. Such simultaneous attempts to load the same few programs are difficult for file systems to handle and thus affect performance. The replicated transmission of the same program data across the network from the file system to multiple nodes also affects performance.

SUMMARY

Embodiments disclosed herein provide a method, system, and computer program product for performing an operation for loading a plurality of programs associated with a computing job in a parallel computing system including multiple nodes. The operation includes, for each program, generating a respective class route, the class route including a set of one or more compute nodes of the parallel computing system which are to execute the program as part of performing the computing job. The operation further includes, for each class route, selecting one of the nodes of the class route to load one of the programs associated with the computing job and corresponding to the class route; loading, by the selected node, the one of the programs from a file system; and broadcasting, by the selected node, the one of the programs along the class route.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
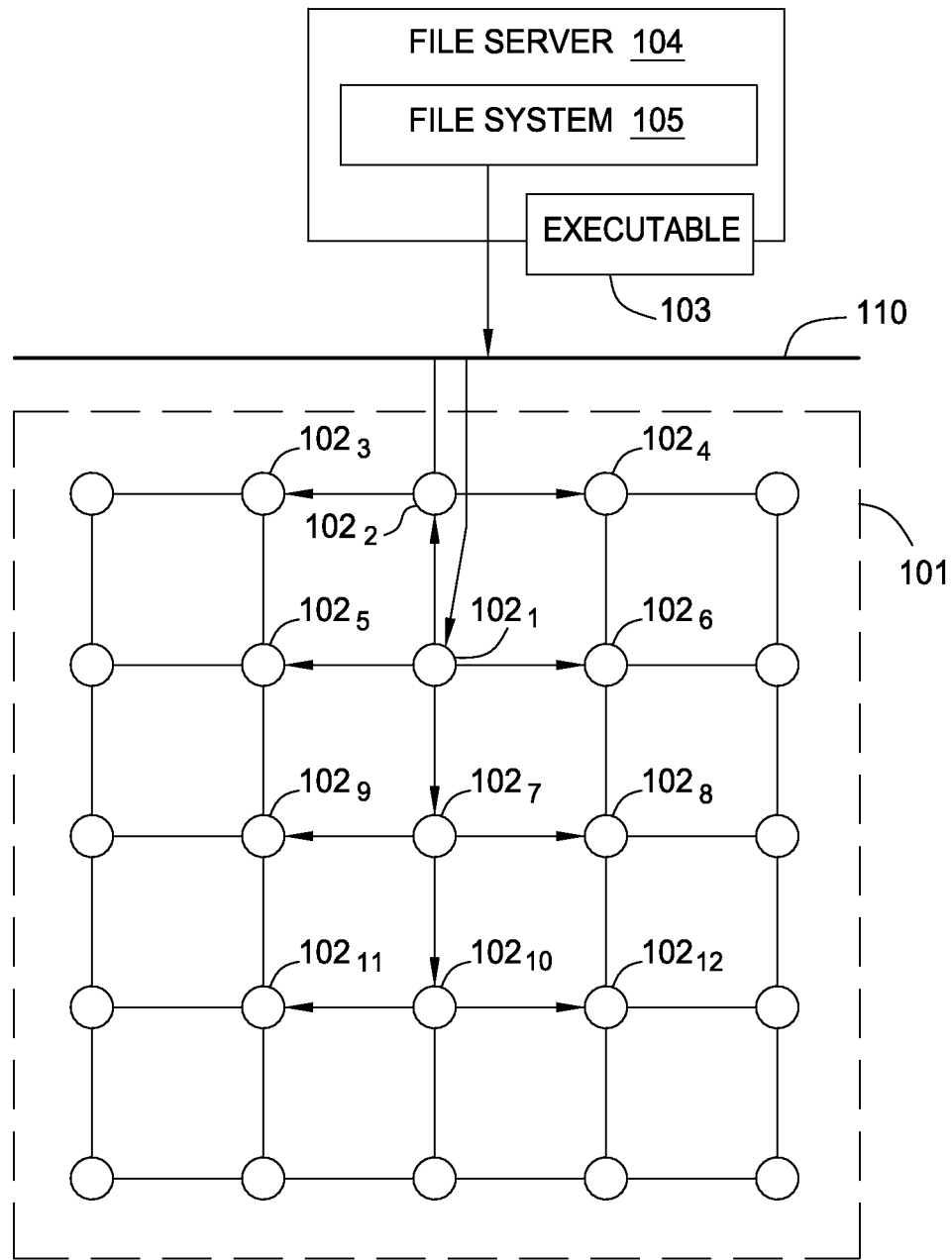
FIG. 1 is a schematic illustrating an approach for loading programs for a MPMD job on a massively parallel computing system, according to an embodiment of the invention.

Embodiments disclosed herein provide techniques for efficiently loading application programs associated with a common job on the compute nodes of a parallel computing system. In one embodiment, nodes of the parallel computing system receive (or generate) a load description file which indicates, for each program of a MPMD job, which nodes should load the program. The nodes use collective operations to determine a total number of programs to load and a number of programs to load in parallel. The nodes may further generate a custom class route for each program to be loaded in parallel. As used herein, a class route is a logical tree which may be overlaid on a multidimensional network, such as a torus network. A description of class routes and techniques for generating class routes is further provided in U.S. Pat. No. 8,364,844, hereby incorporated by reference in its entirety. The class route generated for a particular program includes only nodes on which the program needs to be loaded for the job. From the nodes of each class route, a node is selected to be a load leader using a collective operation. The load leader then accesses a file system to load the program associated with the class route and broadcasts the program via the class route to other nodes which require the program. As a result, the other nodes do not need to access the file system, thereby relieving the file system from having to handle multiple access requests and eliminating the need to transfer the same program data from the file server to multiple nodes of the parallel computing system.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic illustrating an approach for loading programs for a MPMD job on a massively parallel computing system, according to an embodiment. As shown, an executable file 103 stored in a file system 105 of a file server 104 is transmitted via a network 110 to a node $102_1$ of a compute core 101. Here, the executable 103 may be one of a number of programs in a MPMD job, such as an ocean current simulation program in a weather job which also includes programs simulating the atmosphere and radiative flux from the sun. The executable 103 may be transmitted in response to, e.g., a file open request by the node $102_1$, which may be routed through an input/output (I/O) node, as discussed in greater detail below with respect to FIG. 2.

In one embodiment, the node $102_1$ may be a node which is selected to load the executable 103 from the file system 105 so that other nodes need not replicate the load request. In such a case, the nodes of the compute core 101 may generate, based on a load description file which indicates programs to load for a given job and nodes onto which each program is to be loaded, a class route for the executable 103 that includes only those nodes which require the program. As discussed, a class route is a logical tree which may be overlaid on a multidimensional network, such as a torus network. Illustratively, a class route on the torus network 101 includes nodes $102_{1-12}$, with nodes $102_1$ being a root node and nodes $102_{2-6}$, $102_{8-9}$, and $102_{11-12}$ being leaf nodes.

In one embodiment, the parallel computer system configures network hardware of each compute node along the class route with routing instructions in dependence upon available class route identifiers and a network topology for the network. The routing instructions for each compute node participating in the class route associate the available class route identifier with the network links between that compute node and each compute node adjacent to that compute node along the class route. A source compute node may transmit a network packet to a target compute node along the class route, which includes encoding the available class route identifier in a network packet. The network hardware of each compute node along the communications path routes the network packet to the target compute node in dependence upon the routing instructions for the network hardware of each compute node and the available class route identifier encoded in the network packet. As used herein, the source compute node is a compute node attempting to transmit a network packet, while the target compute node is a compute node intended as a recipient of the network packet.

In one embodiment, a class route identifier is an identifier that specifies a set of routing instructions for use by a compute node in routing a particular network packet in the network. When a compute node receives a network packet, the network hardware of the compute node identifies the class route identifier from the header of the packet and then routes the packet according to the routing instructions associated with that particular class route identifier. Accordingly, by using different class route identifiers, a compute node may route network packets using different sets of routing instructions. The number of class route identifiers that each compute node is capable of utilizing may be finite and may typically depend on the number of bits allocated for storing the class route identifier. For example, a compute node may be capable of utilizing sixteen class route identifiers labeled 0-15 but only actively utilize class route identifiers 0 and 1. To deactivate the remaining class route identifiers, the compute node may disassociate each of the available class route identifiers with any routing instructions or maintain a list of the available class route identifiers in memory.

Routing instructions specify the manner in which a compute node routes packets for a particular class route identifier. Using different routing instructions for different class route identifiers, a compute node may route different packets according to different routing instructions. For example, for one class route identifier, a compute node may route packets specifying that class route identifier to a particular adjacent compute node. For another class route identifier, the compute node may route packets specifying that class route identifier to different adjacent compute node. In such a manner, two different routing configurations may exist among the same compute nodes on the same physical network.

Having obtained a custom class route for the executable 103, the nodes may select a particular node among the nodes of the class route as a load leader. The load leader is responsible for actually loading the executable 103 from the file system 105, then broadcasting the executable 103 via the class route. Doing so eliminates the need for other nodes to access the file system to load the same executable 103, thereby relieving the file system 105 from having to handle multiple access requests and eliminating the transfer of identical program data from the file server 104 to multiple nodes. Illustratively, node $102_1$ is the load leader for the class route depicted in FIG. 1. Note, however, that the load leader need not be a root node of the class route, as broadcasts may be performed from any node of the class route, as discussed in greater detail below.

The load leader may be chosen using any feasible technique for selecting a unique node from the nodes of the class route. In one embodiment, the nodes of the compute core 101 may perform a collective operation to determine the load leader. For example, the nodes may perform an all-reduce MIN or MAX operation on the custom class route using a unique identifier for each node or task which runs on a node, such as an operation to identify a minimum or maximum torus coordinates of the nodes. In the all-reduce MIN or MAX operation, each node may contribute its own torus coordinates and perform logical operation(s) to determine the minimum or maximum of the torus coordinates received at the node and the node's own coordinates, then transmit that minimum or maximum torus coordinates "uptree." As used herein, "uptree" refers to movement towards a root node of the logical tree, i.e., movement away from leaf nodes of the logical tree. At the root node, an additional comparison may be made using the root node's torus coordinates, and the result broadcasted down the logical tree as the minimum or maximum torus coordinates.

In a particular embodiment, load leaders may be selected to broadcast programs in via multiple class routes according to the following pseudo-code. Doing so further improves performance, as loading of multiple programs is performed in parallel. In this example, class route 0 is a prefabricated class route that contains all nodes in the job. The prefabricated class route may be generated by a control system given the layout of network cables and the like. In one embodiment, custom class routes for broadcasting each executable file may be derived from the prefabricated class route.

```
Determine/Receive a description of the program(s) to load on the node.
Determine the numberOfPrograms to load
Determine the number of MPMD programs to load in parallel
(MAX_CURRENT_LOAD)
Barrier on class route 0
for (i = 0; i < numberOfPrograms; i += MAX_CURRENT_LOAD)
{
    CONCURRENT_LOAD = MIN(numberOfPrograms - i,
    MAX_CURRENT_LOAD);
    for (j = 0; j < CONCURRENT_LOAD; j++)
    {
        ROUTEID = 1 + ((i + j) mod MAX_CURRENT_LOAD)
        Generate a class route $ROUTEID including only the nodes
        participating in the program i + j;
    }
    Barrier on class route 0
    for (j = 0; j < CONCURRENT_LOAD; j++)
    {
        if (NODE_HAS_LOADID(i + j))
        {
            ROUTEID = 1 + ((i + j) mod MAX_CURRENT_LOAD)
            Barrier on class route $ROUTEID
            Select a "load leader"
                *A load leader may be selected by performing
                an all-reduce MIN or MAX operation using a
                unique task/node identifier, such as minimum
                coordinates of a node in a torus network.
            Barrier on class route $ROUTEID
            Determine the number of nodes participating in the
            sequence.
                *The number of nodes may be determined by
                loading a value of '1' into a memory region and
                performing an all-reduce sum.
            Barrier on class route $ROUTEID
            The load leader reads the program from disk and
            broadcasts sections of the program onto class route
            $ROUTEID. The hardware then routes and deposits
            the sections only on nodes participating in the class
            route.
            Barrier on class route $ROUTEID
        }
    }
}
```

```
    Barrier on classroute 0
    for (j = 0; j < CONCURRENT_LOAD; j++)
    {
        ROUTEID = 1 + ((i + j) mod MAX_CURRENT_LOAD)
        deallocate class route $ROUTEID
    }
}
```

In this pseudo-code, the compute nodes determine a number of nodes which participate in each class route. This permits the load leaders of class routes to verify, when they send executable data to other nodes, that the correct number of nodes have received that data before additional data is transmitted. In addition, the barriers in the pseudo-code ensure that every node is at a certain point in execution before any node proceeds further. For example, a barrier on class route $ROUTEID ensures that every node has generated that class route before any traffic is sent over that class route.

Figure 2:
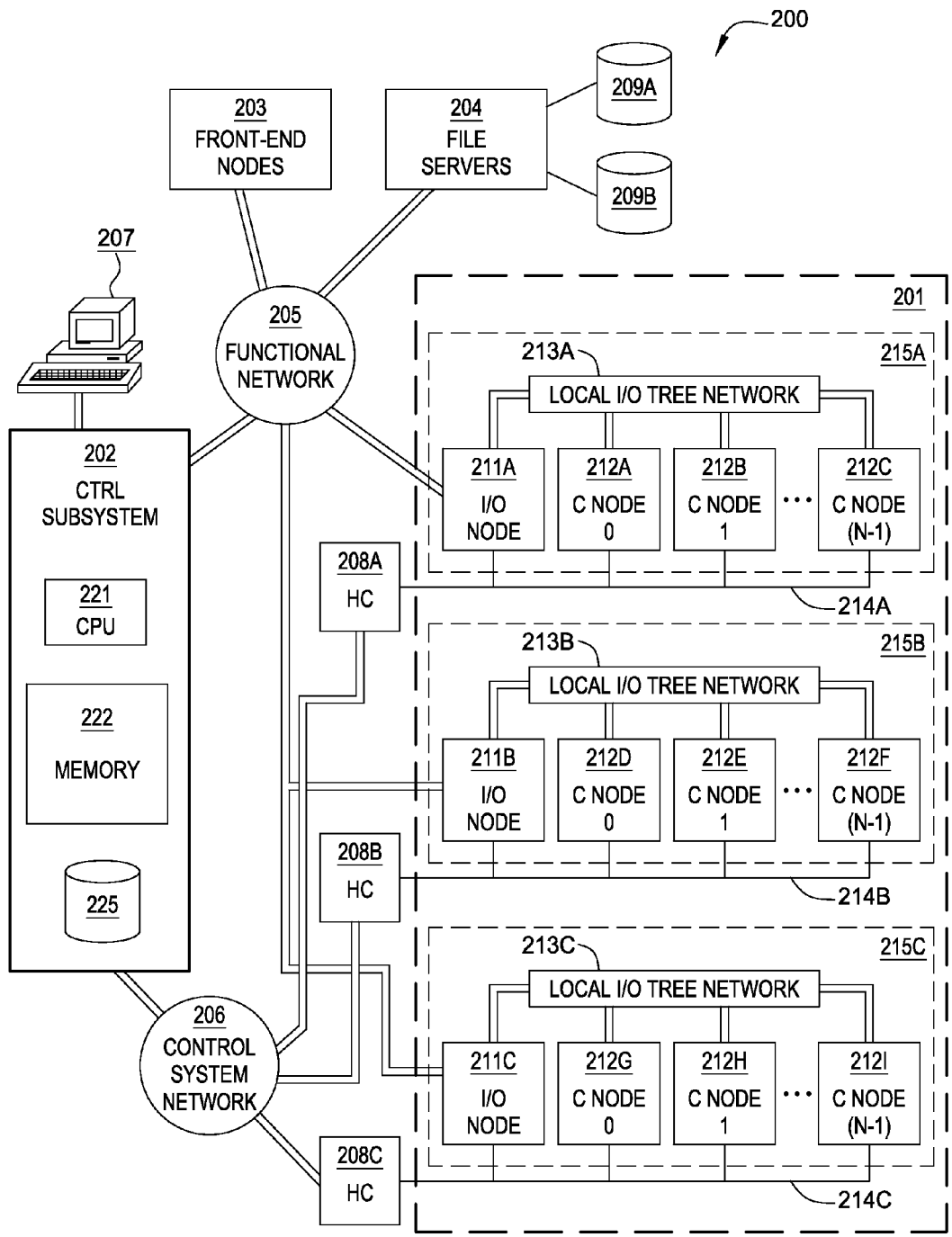
FIG. 2 is a block diagram of components of a massively parallel computer system, according to an embodiment of the invention.

FIG. 2 is a block diagram of components of a parallel computer system 200, according to an embodiment. Illustratively, computer system 200 shows the high-level architecture of an IBM Blue Gene® computer system, it being understood that other parallel computer systems could be used, and the description of an embodiment herein is not intended to limit the present disclosure.

As shown, computer system 200 includes a compute core 201 having a number of compute nodes arranged in a regular array or matrix, which perform the useful work performed by system 200. The operation of computer system 200, including compute core 201, may be controlled by control subsystem 202. Various additional processors in front-end nodes 203 may perform auxiliary data processing functions, and file servers 204 provide an interface to data storage devices such as disk based storage 209A, 209B or other I/O (not shown). Functional network 205 provides the primary data communication path among compute core 201 and other system components. For example, data stored in storage devices attached to file servers 204 is loaded and stored to other system components through functional network 205.

Also as shown, compute core 201 includes I/O nodes 211A-C and compute nodes 212A-I. Compute nodes 212 provide the processing capacity of parallel system 200, and are configured to execute applications written for parallel processing. I/O nodes 211 handle I/O operations on behalf of compute nodes 212. Each I/O node 211 may include a processor and interface hardware that handles I/O operations for a set of N compute nodes 212, the I/O node and its respective set of N compute nodes are referred to as a Pset. Compute core 201 contains M Psets 215A-C, each including a single I/O node 211 and N compute nodes 212, for a total of M×N compute nodes 212. The product M×N can be very large. For example, in one implementation M=1024 (1K) and N=64, for a total of 64K compute nodes.

In general, application programming code and other data input required by compute core 201 to execute user applications, as well as data output produced by the compute core 201, is communicated over functional network 205. The compute nodes 212 within a Pset 215 communicate with the corresponding I/O node over a corresponding local I/O collective network 213A-C. The I/O nodes, in turn, are connected to functional network 205, over which they communicate with I/O devices attached to file servers 204, or with other system components. Thus, the local I/O collective networks 213 may be viewed logically as extensions of functional network 205, and like functional network 205 are used for data I/O, although they are physically separated from functional network 205. One example of the collective network is a tree network.

Control subsystem 202 directs the operation of the compute nodes 212 in compute core 201. Control subsystem 202 is a computer that includes a processor (or processors) 221, internal memory 222, and local storage 225. An attached console 207 may be used by a system administrator or similar person. Control subsystem 202 may also include an internal database which maintains state information for the compute nodes in core 201, and an application which may be configured to, among other things, control the allocation of hardware in compute core 201, direct the loading of data on compute nodes 211, and perform diagnostic and maintenance functions.

Control subsystem 202 communicates control and state information with the nodes of compute core 201 over control system network 206. Network 206 is coupled to a set of hardware controllers 208A-C. Each hardware controller communicates with the nodes of a respective Pset 215 over a corresponding local hardware control network 214A-C. The hardware controllers 208 and local hardware control networks 214 are logically an extension of control system network 206, although physically separate.

In addition to control subsystem 202, front-end nodes 203 provide computer systems used to perform auxiliary functions which, for efficiency or otherwise, are best performed outside compute core 201. Functions which involve substantial I/O operations are generally performed in the front-end nodes. For example, interactive data input, application code editing, or other user interface functions are generally handled by front-end nodes 203, as is application code compilation. Front-end nodes 203 are connected to functional network 205 and may communicate with file servers 204.

Figure 3:
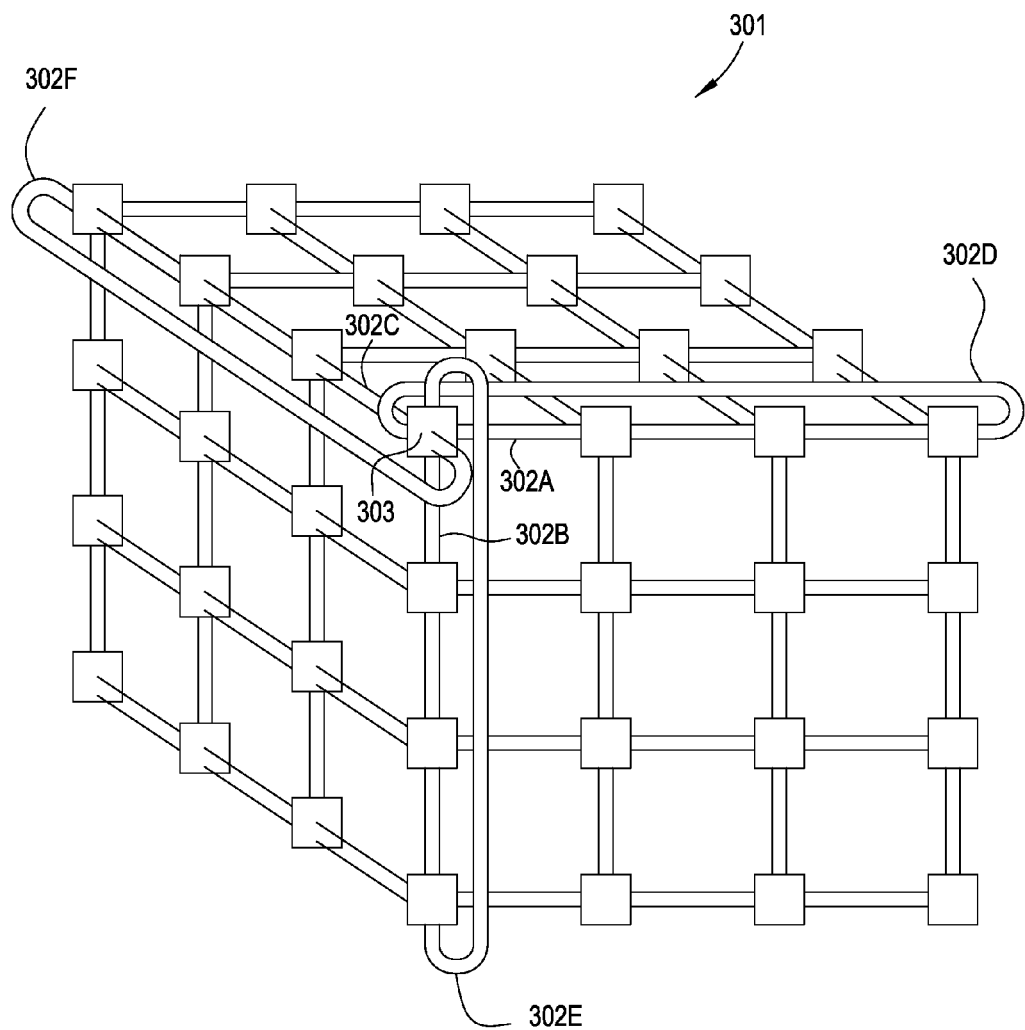
FIG. 3 is a conceptual illustration of a three-dimensional torus network of the system, according to an embodiment of the invention.

In one embodiment, compute nodes 212 are arranged logically in a three-dimensional torus, where each compute node 212 may be identified using an x, y and z coordinate. FIG. 3 is a conceptual illustration of a three-dimensional torus network of system 200, according to an embodiment disclosed herein. More specifically, FIG. 3 illustrates a 4×4×4 torus 301 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 212 in torus 301 includes a set of six node-to-node communication links 302A-F which allows each compute nodes in torus 301 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 301, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 3 by links 302D, 302E and 302F which wrap around from a last node in the x, y and z dimensions to a first node. Thus, although node 303 appears to be at a "corner" of the torus, node-to-node links 302A-F link node 303 to nodes 302D, 302E and 302F, in the x, y and z dimensions of torus 301.

Figure 4:
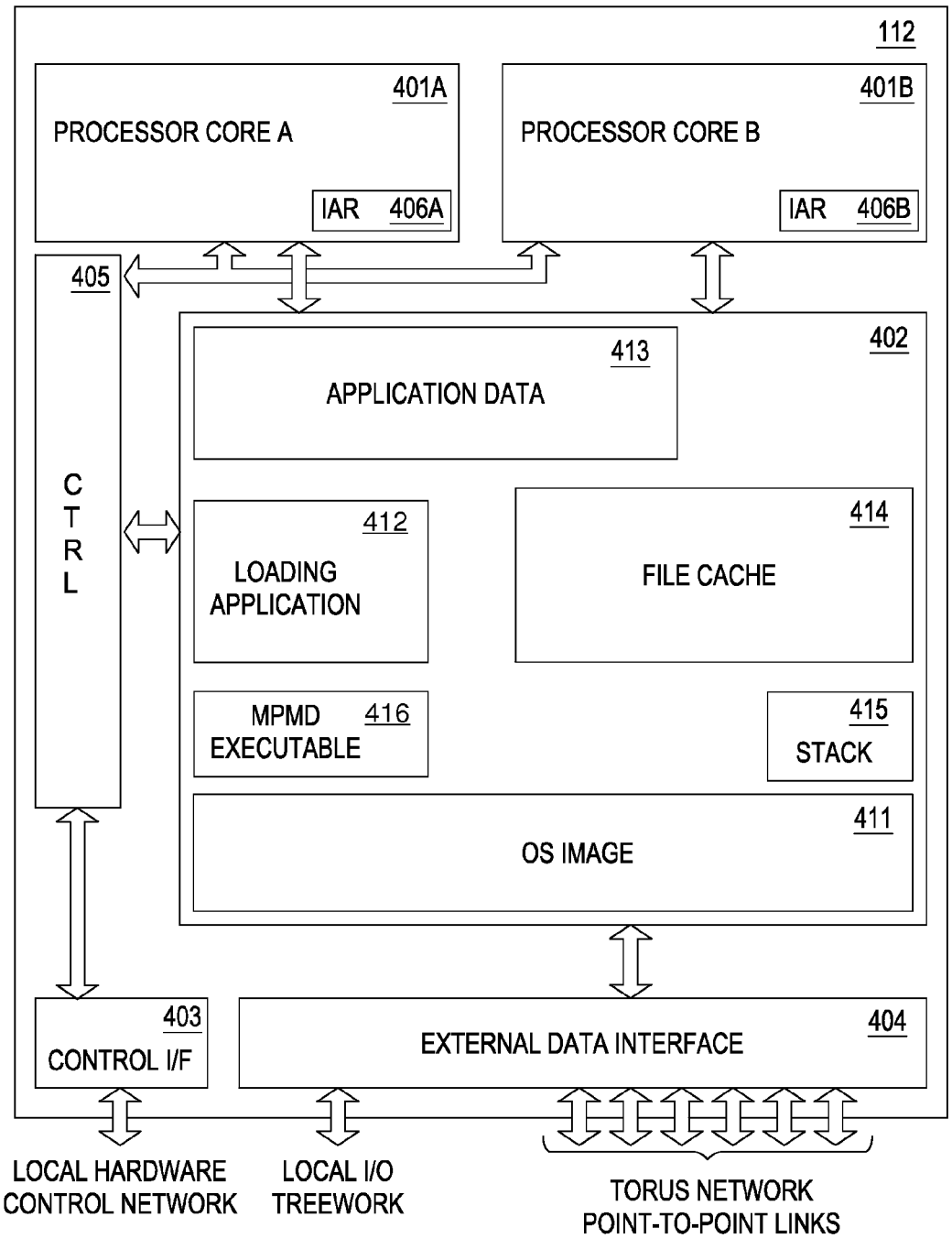
FIG. 4 is a diagram of a node of the system, according to an embodiment of the invention.

FIG. 4 is a diagram of a compute node 212 of the system 200 of FIG. 2, according to an embodiment. The compute node 212 may correspond to the compute nodes $102_{1-12}$ of FIG. 1. In one embodiment, each compute node 212 may be physically implemented as a single, discrete integrated circuit chip.

As shown, the compute node 212 includes processor cores 401A and 401B, and also includes memory 402 used by both processor cores 401; an external control interface 403 which is coupled to local hardware control network 214; an external data communications interface 404 which is coupled to the corresponding local I/O collective network 213, and the corresponding six node-to-node links 302 of the torus network 301; and monitoring and control logic 405 which receives and responds to control commands received through external control interface 403. Monitoring and control logic 405 may access processor cores 401 and locations in memory 402 on behalf of control subsystem 202 to read (or in some cases alter) the operational state of compute node 212.

In a Blue Gene system, the external data interface 404 may transmit message passing interface (MPI) messages by encapsulating such messages within packets and transmitting the packets of over a network (e.g., a tree or torus network). For example, the MPI call of MPI_Send( ) may be used to transmit a message, and the call of MPI_Bcast( ) may be used to broadcast the message. Other parallel systems and other parallel computing libraries may include similar mechanisms.

As shown in FIG. 4, memory 402 stores an operating system image 411, an application code image 412 and user application data structures 413. Some portion of memory 402 may be allocated as a file cache 414, i.e., a cache of data read from or to be written to an I/O file. Operating system image 411 provides a copy of a simplified-function operating system running on compute node 212. Operating system image 411 may include a minimal set of functions required to support operation of the compute node 212. As shown, the memory 402 also includes a loading application 412. In one embodiment, the loading application 412 may coordinate with loading applications running on other compute nodes to agree on a total number of unique executable(s) to load and a number of executable(s) to load in parallel. For each executable (e.g., MPMD executable 416) to load, the loading application 412 may, in conjunction with other loading applications on other compute nodes, generate a custom class route for that executable's distribution such that only nodes which require the executable receive packets of a broadcast over the custom class route. One of the nodes may then be selected as a load leader, load the executable onto local memory of the node, and broadcast the executable along the custom class route.

Although discussed in FIG. 4 with respect to a compute node, I/O nodes 211 of the parallel computing system may also have processors, memories, external data interfaces, etc. As discussed, the I/O nodes 211 may handle I/O operations for compute nodes, such as I/O operations to a file system.

Figure 5:
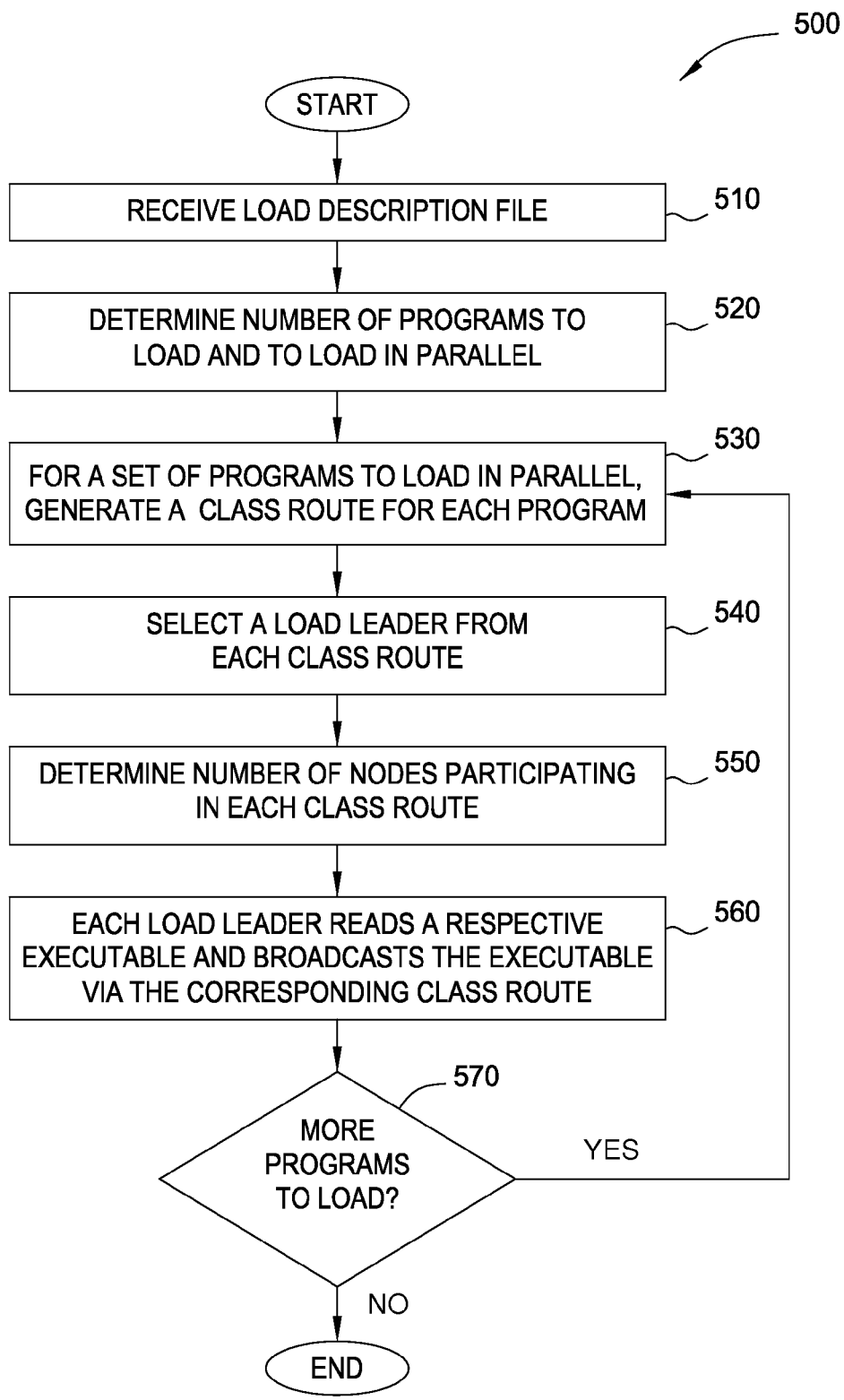
FIG. 5 is a flow chart illustrating a method for loading MPMD programs in a parallel computing system, according to an embodiment of the invention.

FIG. 5 is a flow chart illustrating a method 500 for loading MPMD programs in a parallel computing system, according to an embodiment. As shown, the method 500 begins at step 510, where compute nodes of the parallel computing system receive a load description file. The load description file may indicate which programs to load for an MPMD job and the nodes which receive any given executable file. In general, the nodes which receive the executable file may depend on, e.g., the code of the executable itself, how data patterns and data flows are set up for the job, and the like. For example, a MPMD weather job may include an ocean currents program whose tasks intercommunicate frequently. In such a case, the load description file may indicate a node layout for programs of the MPMD job that facilitates the intercommunication of the ocean currents program tasks, such as a layout in which the tasks run on geographically close compute nodes. The load description file may be manually written or automatically generated. In some embodiments, the load description file may also include other data for the job, such as a command line argument list, environment variables, memory configurations, and the like. In alternative embodiments, the load description may not be a file. For example, the load description may be a script instead which describes how executables are loaded onto nodes.

At step 520, the compute nodes determine a number of programs to load for the job and a number of programs to load in parallel. In one embodiment, the number of programs to load may be determined using collective operations. For example, based on the load description file, each program may be associated with a unique load ID, beginning with 1. In such a case, the compute nodes may perform an all-reduce MAX operation to determine the maximum ID, which equals the number of programs to load. The number of programs to load in parallel may also be agreed upon between the nodes. For example, the nodes may dynamically agree to load a given number of programs in parallel based on performance considerations. In an alternative embodiment, programs may simply be loaded iteratively.

At step 530, the compute nodes generate a class route for each program of a set of programs to be loaded in parallel. That is, given the set of programs to be loaded in parallel, the compute nodes generate a class route for each of those programs. In one embodiment, the class route for a given program may include only those nodes on which the program is to be deposited. In such a case, network hardware of each compute node along the class route may be configured with routing instructions for routing, to the nodes on which the program is to be deposited, packets having a class route ID associated with the program.

At step 540, the compute nodes select a load leader for each class route. In general, the load leader may be selected as any unique node participating in the class route. In one embodiment, the compute nodes may select such a unique node by performing an all-reduce MIN or MAX operation on the class route to determine a node of the class route that has minimum or maximum torus coordinates. In the all-reduce MIN or MAX operation, each node of the class route may contribute its own torus coordinates and perform logical operation(s) to determine the minimum or maximum of the torus coordinates received at the node and the node's own coordinates, then transmit that minimum or maximum torus coordinates uptree. At the root node, an additional determination may be made of the minimum or maximum torus coordinates given the received coordinates and the root node's own coordinates, and the result broadcast down the logical tree as the minimum or maximum torus coordinates. A node which receives the minimum or maximum torus coordinates and determines that those coordinates match the node's own coordinates then becomes the load leader. Conversely, nodes which receive the minimum or maximum torus coordinates and determine that those coordinates do not match the nodes' own coordinates expect to receive the program from the load leader.

In an alternative embodiment, the load leader may be selected, at least in part, based on its I/O performance. For example, when multiple executable files are loaded in parallel via I/O nodes that handle I/O operations on behalf of compute nodes, as discussed above, load leaders may be selected that target different I/O nodes in order to maximize bandwidth from the file system.

At step 550, the compute nodes determine a number of nodes participating in each class route. Doing so permits the load leader to ensure, when it sends executable data to other nodes, that the correct number of nodes have received that data before additional data is transmitted. In one embodiment, the compute nodes may determine the number of nodes participating in a class route by performing an all-reduce sum operation on the class route. In the all-reduce sum operation, each node of the class route may add a 1 to a packet transmitted uptree. The root node may then adds its own 1 and broadcast the resulting sum down the tree as the number of nodes participating in the class route.

At step 560, the load leaders each load a program and broadcast the program via a respective class route. Doing so eliminates the need for other nodes to access the file system to load the same program, thereby relieving the file system from having to handle multiple access requests and also eliminating the transfer of identical program data from the file server to multiple nodes. To load a program, the load leader may open an executable file for the program and read data from that file into local memory. In one embodiment, file open requests may be transmitted to an I/O node which handles I/O operations on behalf of compute nodes. The I/O node may then relay the file open request to the file system. To broadcast the program after it is read into local memory, the load leader may transmit data packets which include the executable's data, as well as operation code (OP code) bit(s) specifying the broadcast operation in the packet header and an appropriate class route ID, uptree to the root node of the class route. The root node may then rebroadcast the data packets down to all nodes of the class route. Once the broadcast of the program is complete, the nodes may deallocate or reuse the classroute.

At step 570, if additional programs remain to be loaded, the method 500 returns to step 530, where the compute nodes generate additional class routes for another set of programs to be loaded so that those programs may be loaded by load leaders, then broadcast to other nodes via the class routes. Once all programs have been loaded on appropriate compute nodes, the compute nodes may begin running those programs for the MPMD job.

Advantageously, embodiments disclosed herein load each program in an MPMD job on one node of a parallel computing system, and broadcast the program to other nodes that require the program. The other nodes do not access a file system to load the program, thereby relieving the file system from having to handle multiple access requests for the same program. In addition, multiple programs needed for the MPMD job may be loaded in parallel using broadcasts over different class routes, thereby reducing total loading time.

While the foregoing is directed to embodiments of the present disclosure, other and further embodiments of the disclosure may be devised without departing from the basic scope thereof, and the scope thereof is determined by the claims that follow.

What is claimed is:

1. A computer program product for loading a plurality of programs associated with a computing job in a parallel computing system including multiple nodes, the computer program product comprising:
 a non-transitory computer-readable storage medium having computer-readable program code embodied therewith, the computer-readable program code comprising:
  computer-readable program code configured to, for each program, generate a respective class route, the class route including a set of one or more compute nodes of the parallel computing system which are to execute the program as part of performing the computing job; and
  computer-readable program code configured to, for each class route:
   select one of the nodes of the class route to load one of the programs which corresponds to the class route,
   load, by only the selected node, the one of the programs from a file system, and
   broadcast, by the selected node, the one of the programs along the class route,
  wherein at least two of the plurality of programs are loaded and broadcast via respective class routes in parallel.

2. The computer program product of claim 1, further comprising, computer-readable program code configured to receive or generate a load description, the load description indicating, for each of the plurality of programs, nodes which load the programs, wherein the class routes are generated based on the load description.

3. The computer program product of claim 2, wherein the load description further includes one or more of commandline arguments, environment variables, and memory configurations.

4. The computer program product of claim 1, wherein the node selected for each class route is selected via a collective operation.

5. The computer program product of claim 1, wherein the node selected for each class route is selected based on input/output performance.

6. The computer program product of claim 1, further comprising, computer-readable program code configured to determine a total number of programs to load via an all-reduce sum operation.

7. The computer program product of claim 1, further comprising, computer-readable program code configured to determine, for each class route, a total number of nodes participating in the class route via an all-reduce sum operation.

8. A system, comprising:
 multiple compute nodes, each including one or more computer processors; and
 a memory containing a program, which, when executed by one or more of the computer processors of the multiple compute nodes, performs an operation for loading a plurality of programs associated with a computing job, the operation comprising:
  for each program, generating a respective class route, the class route including a set of one or more of the compute nodes which are to execute the program as part of performing the computing job; and for each class route:
selecting one of the nodes of the class route to load one of the programs which corresponds to the class route,
loading, by only the selected node, the one of the programs from a file system, and
broadcasting, by the selected node, the one of the programs along the class route,
wherein at least two of the plurality of programs are loaded and broadcast via respective class routes in parallel.

9. The system of claim 8, the operation further comprising, one of receiving or generating a load description, the load description indicating, for each of the plurality of programs, nodes which load the programs, wherein the class routes are generated based on the load description.

10. The system of claim 9, wherein the load description further includes one or more of commandline arguments, environment variables, and memory configurations.

11. The system of claim 8, wherein the node selected for each class route is selected via a collective operation.

12. The system of claim 8, wherein the node selected for each class route is selected based on input/output performance.

13. The system of claim 8, the operation further comprising, determining a total number of programs to load via an all-reduce sum operation.

14. The system of claim 8, the operation further comprising, determining, for each class route, a total number of nodes participating in the class route via an all-reduce sum operation.

* * * * *